US009631789B2

(12) United States Patent
White et al.

(10) Patent No.: US 9,631,789 B2
(45) Date of Patent: Apr. 25, 2017

(54) APPARATUS AND METHOD FOR RETROFITTING A FLUORESCENT DOWNLIGHT ILLUMINATION DEVICE

(71) Applicant: TerraLUX, Inc., Longmont, CO (US)

(72) Inventors: Christopher M. White, Frederick, CO (US); Brett James Pardikes, Frederick, CO (US); Steven Howard Ray, Longmont, CO (US)

(73) Assignee: TerraLUX, Inc., Longmont, CO (US)

( * ) Notice: Subject to any disclaimer, the term of this patent is extended or adjusted under 35 U.S.C. 154(b) by 0 days.

(21) Appl. No.: 14/660,159

(22) Filed: Mar. 17, 2015

(65) Prior Publication Data

US 2015/0276141 A1    Oct. 1, 2015

Related U.S. Application Data

(60) Provisional application No. 61/972,801, filed on Mar. 31, 2014.

(51) Int. Cl.
*F21V 29/70* (2015.01)
*F21V 3/04* (2006.01)
(Continued)

(52) U.S. Cl.
CPC .............. *F21V 3/049* (2013.01); *F21S 8/026* (2013.01); *F21V 23/003* (2013.01); *F21V 29/70* (2015.01);
(Continued)

(58) Field of Classification Search
CPC ........ F21V 3/049; F21V 29/70; F21V 21/047; F21V 23/003; F21V 21/04; F21V 21/044;
(Continued)

(56) References Cited

U.S. PATENT DOCUMENTS 5,410,453 A    4/1995 Ruskouski
5,836,677 A    11/1998 Connors et al.
(Continued)

FOREIGN PATENT DOCUMENTS

CN    101173757 A    5/2008
CN    101566292 A    10/2009
(Continued)

OTHER PUBLICATIONS

Samborski, Malgorzata, "Canadian Office Action re Application No. 2885390", Apr. 18, 2016, p. 3 Published in: CA.
(Continued)

*Primary Examiner* — Bao Q Truong
(74) *Attorney, Agent, or Firm* — Neugeboren O'Dowd PC

(57) ABSTRACT

In various embodiments, a downlight illumination device is upgraded to an illumination device based on one or more light-emitting diodes (LEDs) via a retrofit kit that includes (i) a lighting module comprising one or more LEDs, (ii) a driver module comprising circuitry for receiving power from the power source and supplying compatible power to the one or more LEDs, (iii) a flexible conduit connecting the lighting module to the driver module and containing therewithin a plurality of wires electrically connecting the lighting module to the driver module, and (iv) an alignment bracket for attachment within the housing and configured to receive the lighting module.

33 Claims, 11 Drawing Sheets

(51) Int. Cl.
*F21S 8/02* (2006.01)
*F21V 23/00* (2015.01)
*F21Y 101/00* (2016.01)
*F21Y 115/10* (2016.01)

(52) U.S. Cl.
CPC ....... *F21Y 2101/00* (2013.01); *F21Y 2115/10* (2016.08); *Y02B 20/386* (2013.01)

(58) Field of Classification Search
CPC .... F21V 21/041; F21V 21/048; F21V 21/049; F21K 9/27; F21K 9/175; F21S 8/026; F21S 8/02; F21S 8/024; F21Y 2101/00; F21Y 2115/10; H05B 33/0845
See application file for complete search history.

(56) References Cited

U.S. PATENT DOCUMENTS

| | | |
|---|---|---|
| 6,095,671 A | 8/2000 | Hutain |
| 6,168,285 B1 | 1/2001 | Flohre |
| 6,168,299 B1 | 1/2001 | Yan |
| 6,350,046 B1 | 2/2002 | Lau |
| 6,739,734 B1 | 5/2004 | Hulgan |
| 6,755,559 B2 | 6/2004 | Wang et al. |
| 7,001,039 B1 | 2/2006 | Aubrey |
| 7,026,923 B2 | 4/2006 | Martin |
| 7,318,661 B2 | 1/2008 | Catalano |
| 7,473,005 B2 | 1/2009 | O'Brien |
| 7,507,001 B2 | 3/2009 | Kit |
| 7,628,504 B2 | 12/2009 | Glickman |
| 7,644,508 B1 | 1/2010 | Schmitz |
| 7,646,029 B2 | 1/2010 | Mueller et al. |
| 7,677,770 B2 | 3/2010 | Mazzochette |
| 8,408,759 B1 * | 4/2013 | Rashidi ................... F21S 8/026 362/150 |
| 8,506,134 B2 * | 8/2013 | Wilson ................... F21S 8/026 362/365 |
| 8,696,158 B2 * | 4/2014 | Santiago ................. F21S 8/026 362/249.02 |
| 8,950,898 B2 | 2/2015 | Catalano |
| 9,039,254 B2 * | 5/2015 | Danesh .................. F21V 21/30 362/147 |
| 2004/0189218 A1 | 9/2004 | Leong et al. |
| 2008/0232116 A1 | 9/2008 | Kim |
| 2008/0285291 A1 | 11/2008 | Fornari |
| 2009/0135608 A1 | 5/2009 | Sell |
| 2009/0207603 A1 | 8/2009 | Lydecker et al. |
| 2010/0061108 A1 | 3/2010 | Zhang et al. |
| 2010/0109536 A1 | 5/2010 | Jung et al. |
| 2010/0110682 A1 | 5/2010 | Jung et al. |
| 2010/0110698 A1 | 5/2010 | Harwood et al. |
| 2010/0148673 A1 | 6/2010 | Stewart et al. |
| 2010/0327766 A1 | 12/2010 | Recker et al. |
| 2011/0026245 A1 | 2/2011 | Lau |
| 2012/0113642 A1 | 5/2012 | Catalano |
| 2012/0182744 A1 | 7/2012 | Santiago et al. |
| 2013/0100650 A1 * | 4/2013 | Beregszaszi ............ F21S 8/026 362/145 |

FOREIGN PATENT DOCUMENTS

| | | |
|---|---|---|
| CN | 202469838 U | 10/2012 |
| DE | 202009014794 U1 | 2/2010 |
| JP | 2010-153048 A | 7/2010 |
| WO | 2008/051957 A2 | 5/2008 |
| WO | 2009/039722 A1 | 4/2009 |
| WO | 2010/117813 A2 | 10/2010 |
| WO | 2011/032059 A1 | 3/2011 |
| WO | 2012/078300 A1 | 6/2012 |

OTHER PUBLICATIONS

Examination Report Received for Australian Patent Application No. 2011338922, mailed on Apr. 2, 2014 3 pages.

Examination Report Received for Chinese Patent Application No. 201180054031.X, mailed on Aug. 29, 2014 19 pages. (8 pages of Official Copy and 11 pages of English Translation).

PCT International Patent Application No. PCT/US2011/060101, International Preliminary Report on Patentability mailed May 23, 2013, 7 pages.

PCT International Patent Application No. PCT/US2011/060101, International Search Report and Written Opinion mailed Apr. 5, 2012, 10 pages.

Examination Report Received for Chinese Patent Application No. 201180054031.X, mailed on Feb. 25, 2015 16 pages. (6 pages of Official Copy and 10 pages of English Translation).

* cited by examiner

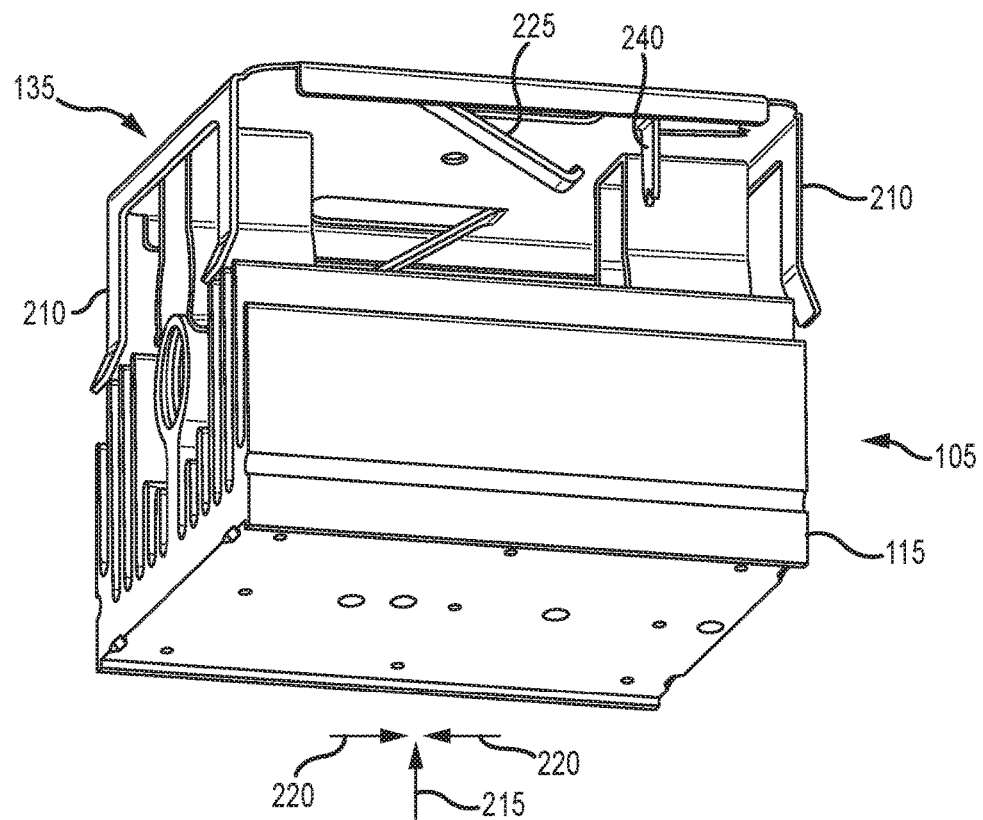
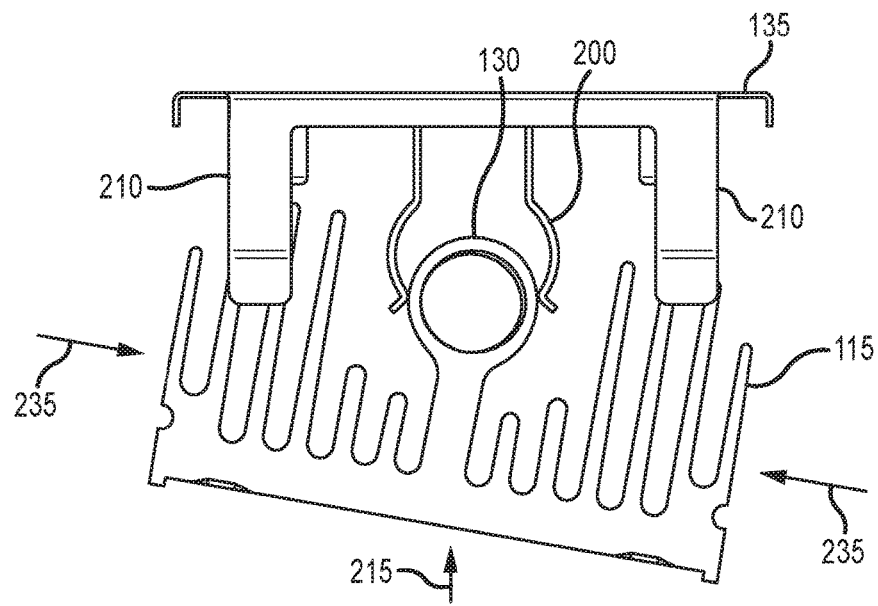

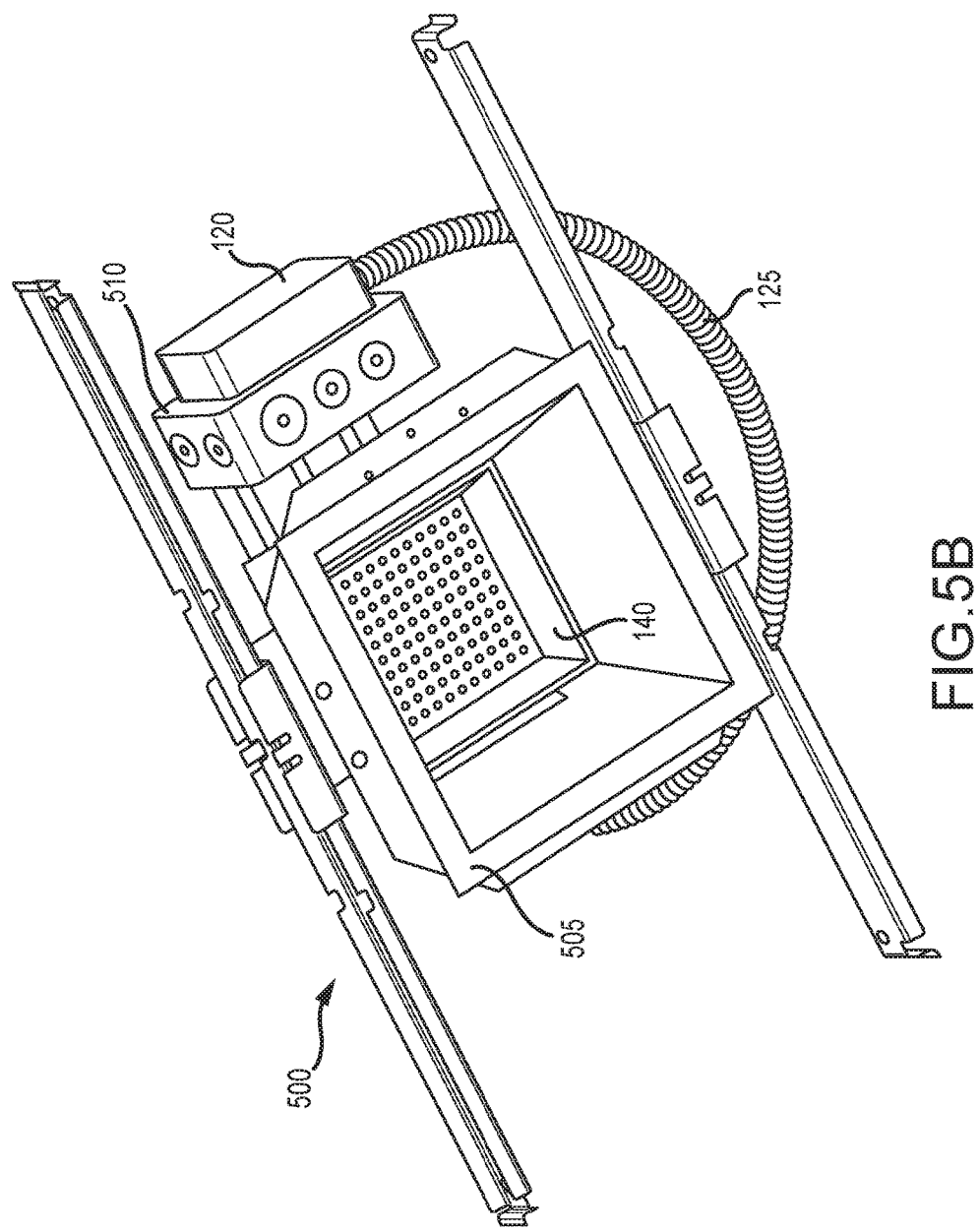

APPARATUS AND METHOD FOR RETROFITTING A FLUORESCENT DOWNLIGHT ILLUMINATION DEVICE

RELATED APPLICATION

This application claims the benefit of and priority to U.S. Provisional Patent Application No. 61/972,801, filed Mar. 31, 2014, the entire disclosure of which is hereby incorporated herein by reference.

FIELD OF THE INVENTION

In various embodiments, the present invention relates to illumination devices, in particular illumination devices incorporating light-emitting diodes.

BACKGROUND

One of the most common light fixtures is the recessed can downlight (RCD), which is an open-bottom can that contains a light bulb, most commonly an incandescent bulb or a fluorescent bulb. The fixture is typically connected to the power mains at 120 to 277 volts, 50/60 Hz. RCDs are generally installed during the construction of a building before the ceiling material (such as plaster or gypsum board) is applied. Therefore, they are not easily removed or substantially reconfigured during their lifetime.

RCDs generally also accommodate light bulbs having various sizes, different overall dimensions (i.e., length, width, and diameter), and varied light-distribution capabilities. For example, various bulbs have narrow, medium, or wide (flood) distributions. Therefore, the internal features of the RCD are constructed to accommodate many (if not all) different bulb types. Such features include mechanisms to adjust the vertical position of the bulb socket, as well as reflectors that channel and distribute the light. Because there are so many different light bulbs and finishes, a very large number of trim rings and optics combinations may be utilized in RCDs, in addition to the various spacers that accommodate the bulbs. Thus a complex arrangement of parts is needed for each RCD that is produced.

Because LEDs have very high efficiency (e.g., 100 lumens per watt compared to 10-15 lumens per watt for incandescent or halogen lights) and a long lifetime (e.g., 10,000-100,000 hours), they are attractive for virtually all lighting applications. However, even a dedicated LED-based downlight would have the disadvantage of only being compatible with new construction (without a prohibitively costly overhaul of an entire lighting system and related infrastructure), and thus would be unavailable for retrofitting into the large installed base of incandescent- or fluorescent-based RCDs. Moreover, because the LED technology itself is rapidly changing, LED-based fixtures become obsolete as the LED technology, as well as the optics and cooling technology vital to performance, improve.

LED-based light bulbs represent a logical alternative. These products contain electronics, optics and heat sinks all in a form factor identical to that of the particular light bulb to be replaced. Such designs may be quite difficult to achieve, however, and generally necessitate strict control over power consumption in order to maintain low enough operating temperatures to avoid thermally-induced premature failure. Hence, the light output of such LED light bulbs is typically well below that of the incandescent light bulbs they replace. For example, a PAR20 LED lamp from Lighting Sciences has a rated output of 350 lumens while a conventional 50 watt PAR20 incandescent bulb has light output in the range of 600-750 lumens. Furthermore, replacement of the light bulb product means discarding and replacing the entire suite of electronics, optics, and heat sink—a costly and wasteful proposition. Moreover, the wide variety of existing RCDs would require an equally large number of different LED-based bulbs for one-to-one replacements, an expensive and complicated proposition.

Thus, there is a need for retrofit devices for RCDs based on LEDs that are compatible with a wide range of differently sized and/or shaped RCD fixtures.

SUMMARY

Embodiments of the present invention advantageously enable retrofitting of a wide variety of different RCDs (e.g., RCDs incorporating fluorescent bulbs) with a single "universal" LED-based retrofit kit that is quickly and efficiently installable. Within the retrofit kit, the LED light sources and control electronics are modularized for ease of assembly and installation. In addition, the retrofit kit may be utilized substantially independent of the specific light bulb being replaced yet conforms to the volume and desired level of illumination of the existing RCD.

Embodiments of the invention typically include a discrete driver module featuring circuitry for supplying power to and controlling the LED light source(s), as well as, in preferred embodiments, circuitry for controlling the LEDs based on sensed temperature (for example, the temperature of the LEDs themselves or of one or more temperature sensors such as thermistors in close proximity to the LEDs). The driver module is electrically connected to a discrete lighting module featuring one or more LEDs (for example, several LEDs arranged in a rectilinear array) via a flexible conduit that contains and protects one or more wires carrying electrical signals between the two modules. Embodiments also typically include an alignment bracket that attaches within the RCD fixture (or a housing therein) and receives the lighting module during installation. The alignment bracket preferably includes one or more features configured to "self-align" the lighting module during installation, thus enabling fast, accurate, and repeatable retrofitting of many RCDs in a building or other venue during a single installation session.

In various embodiments of the invention, the lighting module incorporates one or more temperature sensors for sensing the temperature of the LED(s) and/or the ambient temperature, and the driver module incorporates thermal-feedback circuitry for controlling power supply to the LED(s) based on the sensed temperature. The lighting module also typically incorporates an integral or removable heat sink, and the heat sink and the alignment bracket typically have complementary features that simplify the retrofit installation. The retrofit kit may also include a diffuser assembly configured to mechanically attach to the lighting module and diffuse the light emitted by the LEDs.

Although exemplary embodiments of the invention are described herein as retrofit kits and techniques for RCDs housing fluorescent light bulbs, embodiments of the invention are usable with other varieties of conventional light bulbs, e.g., gas-discharge lamps, incandescent bulbs, halogen bulbs, high-intensity discharge bulbs, arc lamps, and the like.

In an aspect, embodiments of the invention feature a method of upgrading a downlight illumination device (e.g., a fluorescent, incandescent, or halogen downlight illumination device) to an illumination device based on one or more light-emitting diodes (LEDs). The downlight illumination device to be upgraded includes or consists essentially of (i) a fixture at least partially recessed into a ceiling, (ii) a reflective housing disposed in the fixture, (iii) a socket for a light bulb (e.g., a fluorescent light bulb, an incandescent light bulb, or a halogen light bulb) disposed within the housing, and (iv) disposed outside of the housing and electrically connected to the socket, a junction box comprising (a) one or more electrical connections to a power source and (b) a ballast for receiving power from the power source and supplying compatible power to the light bulb. A retrofit kit is provided. The retrofit kit includes or consists essentially of (i) a lighting module comprising one or more LEDs, (ii) a driver module comprising circuitry for receiving power from the power source and supplying compatible power to the one or more LEDs, (iii) a flexible conduit (or other conduit or wired connection) connecting the lighting module to the driver module and containing therewithin a plurality of wires electrically connecting the lighting module to the driver module, and (iv) an alignment bracket for attachment within the housing and receiving the lighting module. The socket for the light bulb is removed from the housing. The ballast is disconnected from the junction box. The electrical connection(s) of the junction box are connected to the driver module. The driver module is affixed to the fixture (e.g., outside of the housing and/or at least partially above the ceiling). The flexible conduit extends into the housing such that the lighting module is positionable within the housing. The alignment bracket is attached within the housing. The lighting module is seated into the alignment bracket to retain the lighting module within the reflective housing, the lighting module remaining not directly electrically connected to the junction box during operation of the lighting module.

Embodiments of the invention may include one or more of the following in any of a variety of combinations. The lighting module may include or consist essentially of (i) a substrate having a bottom surface upon which the one or more LEDs are disposed, and (ii) a heat sink disposed on a top surface of the substrate opposite the bottom surface. The heat sink may include or consist essentially of a thermally conductive material shaped to define (i) a plurality of fins extending away from the substrate, and (ii) integral with one or more of the fins, a cylindrical mounting tube. The cylindrical mounting tube may extend along substantially an entire lateral dimension (e.g., width, diameter, etc.) of the heat sink. The alignment bracket may include or consist essentially of one or more mounting clips configured to partially encircle the mounting tube of the heat sink. When the lighting module is seated into the alignment bracket, the mounting tube may be seated within the one or more mounting clips. The flexible conduit may be configured for connection to the lighting module at one end of the cylindrical mounting tube. The end of the cylindrical mounting tube for connection to the flexible conduit may be threaded. The retrofit kit may include a connection means for securely attaching the flexible conduit to the end of the cylindrical mounting tube. The connection means may include or consist essentially of one or more set screws and/or one or more c-clamps.

The alignment bracket may include one or more vertical leaf springs (a) extending from each of a plurality of sides of the alignment bracket and (b) configured to align the heat sink with the alignment bracket when the lighting module is seated into the alignment bracket. When the lighting module is seated into the alignment bracket, each vertical leaf spring may exert an alignment force on one or more fins of the heat sink. The alignment bracket may include one or more rotation leaf springs (a) extending from a bottom surface of the alignment bracket and (b) configured to exert a leveling force on the heat sink when the lighting module is seated into the alignment bracket. When the lighting module is seated into the alignment bracket, the rotation leaf springs may maintain the substrate of the lighting module approximately parallel to the bottom surface of the alignment bracket. The alignment bracket may include, associated with each of one or more of the rotation leaf springs, a rotation leaf spring stop positioned to contact a fin of the heat sink upon application of a predetermined amount of force on the associated rotation leaf spring, which may thereby limit an amount of force exertable on the associated rotation leaf spring.

The retrofit kit may include a diffuser assembly configured to (i) mechanically attach to the lighting module below the bottom surface of the substrate and/or (ii) diffuse light emitted by the one or more LEDs transmitted through the diffuser assembly. The diffuser assembly may be mechanically attached to the lighting module. The diffuser assembly may be reversibly attachable to the lighting module. The heat sink may define a recessed groove in each of a plurality of sides of the heat sink. The heat sink may define a plurality of gaps between fins of the heat sink. The diffuser assembly may include one or more protrusions each configured to engage the heat sink within one of the recessed grooves and/or one of the gaps between fins. The diffuser assembly may define an opening sized to substantially accommodate the substrate of the lighting module. The diffuser assembly may include, opposite the opening, a diffusive surface for diffusing the light emitted by the one or more LEDs. The diffuser assembly may include, extending from the opening to the diffusive surface, one or more reflective sidewalls for distributing the light emitted by the one or more LEDs within an interior volume of the diffuser assembly.

The retrofit kit may include a back-up power source. The retrofit kit may include a second driver module, discrete from the driver module, comprising circuitry for receiving power from the back-up power source and supplying compatible power to the one or more LEDs, and a second flexible conduit connecting the lighting module to the second driver module and containing therewithin a plurality of wires electrically connecting the lighting module to the second driver module. The back-up power source and/or the second driver module may be affixed outside of the housing and/or at least partially above the ceiling. The second flexible conduit may extend into the housing such that the lighting module is positionable within the housing. The back-up power source may include or consist essentially of a micro inverter.

In another aspect, embodiments of the invention feature a retrofit kit for upgrading a downlight illumination device (e.g., a fluorescent, incandescent, or halogen downlight illumination device) to an illumination device based on one or more light-emitting diodes (LEDs). The downlight illumination device to be upgraded includes or consists essentially of (i) a fixture at least partially recessed into a ceiling, (ii) a reflective housing disposed in the fixture, (iii) a socket for a light bulb (e.g., a fluorescent light bulb, an incandescent light bulb, or a halogen light bulb) that may be disposed within the housing, and (iv) disposed outside of the housing and electrically connected to the socket, a junction box comprising (a) one or more electrical connections to a power source and/or (b) a ballast for receiving power from the power source and supplying compatible power to the light bulb. The retrofit kit includes or consists essentially of a lighting module comprising one or more LEDs, a driver module comprising circuitry for receiving power from the power source and supplying compatible power to the one or more LEDs, a flexible conduit connecting the lighting module to the driver module and containing therewithin a plurality of wires electrically connecting the lighting module to the driver module, and an alignment bracket for attachment within the housing and configured to receive the lighting module.

Embodiments of the invention may include one or more of the following in any of a variety of combinations. The lighting module may include or consist essentially of (i) a substrate having a bottom surface upon which the one or more LEDs are disposed, and (ii) a heat sink disposed on a top surface of the substrate opposite the bottom surface. The heat sink may include or consist essentially of a thermally conductive material shaped to define (i) a plurality of fins extending away from the substrate, and (ii) integral with one or more of the fins, a cylindrical mounting tube. The cylindrical mounting tube may extend along substantially an entire lateral dimension (e.g., width, diameter, etc.) of the heat sink. The alignment bracket may include or consist essentially of one or more mounting clips configured to partially encircle the mounting tube of the heat sink. When the lighting module is seated into the alignment bracket, the mounting tube may be seated within the one or more mounting clips. The flexible conduit may be configured for connection to the lighting module at one end of the cylindrical mounting tube. The end of the cylindrical mounting tube connected to the flexible conduit may be threaded. The retrofit kit may include a connection means for securely attaching the flexible conduit to the end of the cylindrical mounting tube. The connection means may include or consist essentially of one or more set screws and/or one or more c-clamps.

The alignment bracket may include or consist essentially of one or more vertical leaf springs (i) extending from each of a plurality of sides of the alignment bracket and (ii) configured to align the heat sink with the alignment bracket when the lighting module is seated into the alignment bracket. When the lighting module is seated into the alignment bracket, each vertical leaf spring may exert an alignment force on one or more fins of the heat sink. The alignment bracket may include or consist essentially of a plurality of rotation leaf springs (i) extending from a bottom surface of the alignment bracket and (ii) configured to exert a leveling force on the heat sink when the lighting module is seated into the alignment bracket. When the lighting module is seated into the alignment bracket, the rotation leaf springs may maintain the substrate of the lighting module approximately parallel to the bottom surface of the alignment bracket. The alignment bracket may include, associated with each of one or more of the rotation leaf springs, a rotation leaf spring stop positioned to contact a fin of the heat sink upon application of a predetermined amount of force on the associated rotation leaf spring, which may limit an amount of force exertable on the associated rotation leaf spring.

The retrofit kit may include a diffuser assembly configured to (i) mechanically attach to the lighting module below the bottom surface of the substrate and/or (ii) diffuse light emitted by the one or more LEDs transmitted through the diffuser assembly. The diffuser assembly may be reversibly attachable to the lighting module. The heat sink may define a recessed groove in each of a plurality of sides of the heat sink. The heat sink may define a plurality of gaps between fins of the heat sink. The diffuser assembly may include one or more protrusions each configured to engage the heat sink within one of the recessed grooves and/or one of the gaps between fins. The diffuser assembly may define an opening sized to substantially accommodate the substrate of the lighting module. The diffuser assembly may include, opposite the opening, a diffusive surface for diffusing the light emitted by the one or more LEDs. The diffuser assembly may include, extending from the opening to the diffusive surface, one or more reflective sidewalls for distributing the light emitted by the one or more LEDs within an interior volume of the diffuser assembly. The retrofit kit may include a back-up power source. The retrofit kit may include a second driver module, discrete from the driver module, comprising circuitry for receiving power from the back-up power source and supplying compatible power to the one or more LEDs, and a second flexible conduit connecting the lighting module to the second driver module and containing therewithin a plurality of wires electrically connecting the lighting module to the second driver module. The back-up power source may include or consist essentially of a micro inverter.

These and other features of selected embodiments disclosed herein, along with their respective possible advantages, will become more apparent through reference to the following description, the accompanying drawings, and the claims. Furthermore, it is to be understood that the features of the various embodiments described herein are not mutually exclusive and can exist in various combinations and permutations. As used herein unless otherwise indicated, the terms "substantially" and "approximately" mean ±10%, and, in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 2B, 2C, and 2D are views of portions of a retrofit kit interfitting together in accordance with embodiments of the invention;

FIGS. 5A and 5B are views of a retrofit kit installed in a fixture in accordance with embodiments of the invention;

DETAILED DESCRIPTION

Figure 1:
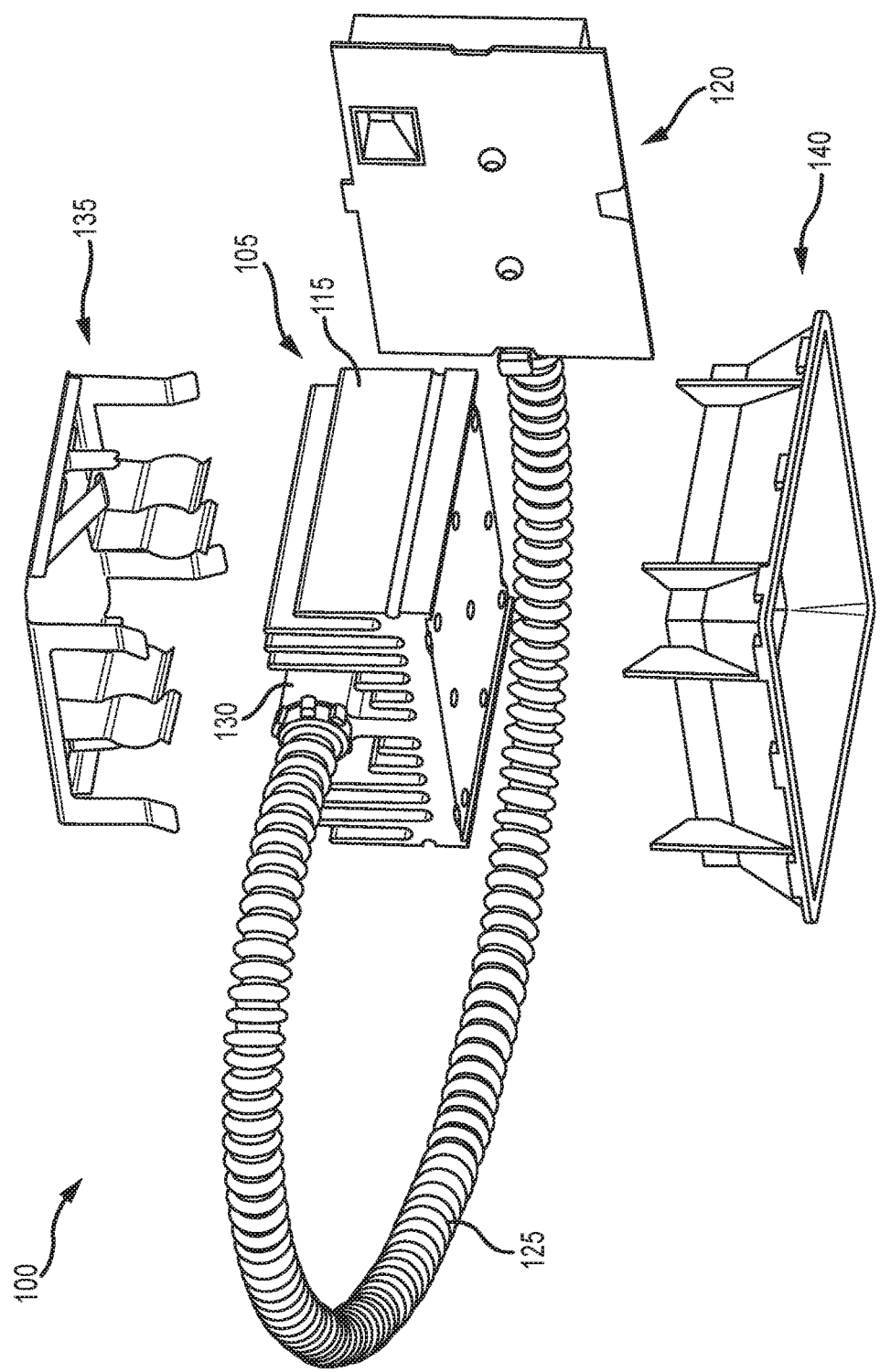
FIG. 1 is an exploded view of a retrofit kit in accordance with embodiments of the invention.

FIG. 1 depicts a retrofit kit 100 in accordance with embodiments of the present invention. As shown, the retrofit kit 100 features a lighting module 105 containing one or more LEDs 110 on its bottom surface (see FIG. 3C) and a heat sink 115 on its top surface, as well as a driver module 120 that houses circuitry for receiving power from the power source powering the RCD to be upgraded (e.g., the AC mains) and transforming such electrical power into a form suitable to drive the LEDs 110 (e.g., DC current). The lighting module 105 may feature a substrate upon which the LEDs 110 are disposed, and the LEDs 110 may be packaged (e.g., with integrated optics and/or encapsulation) and/or substantially unpackaged (e.g., bare dies), and may individually and/or collectively emit any of a variety of colors of light, including white light. The heat sink 115 on the opposite side of the substrate typically features, as shown, a large surface area formed by multiple elongated and spaced-apart fins. As described in more detail below, the heat sink 115 may also incorporate shaped features that facilitate alignment and installation of the lighting module 105 within the RCD fixture.

The driver module 120 may include dimmers, transformers, rectifiers, or ballasts suitable for operation with the LEDs 110, as understood by those of skill in the art, and such components (and/or any other circuitry) of the driver module 120 may be disposed on a printed circuit board. In preferred embodiments, the driver module 120 also provides for thermal feedback (or "foldback") to protect the LEDs 110, as described in, e.g., U.S. Pat. No. 7,777,430, filed Oct. 30, 2007, U.S. Pat. No. 8,358,085 (the '085 patent), filed Jan. 6, 2010, and U.S. Patent Application Publication Nos. 2011/0121760, filed Nov. 17, 2010, and 2012/0299481, filed May 25, 2012, the entire disclosures of which are incorporated by reference herein. For example, the driver module 120 may utilize the temperature sensed at the lighting module 105 to provide over-temperature protection (i.e., reduction in the power supplied to the LEDs 110). The driver module 120 may even incorporate features described in the '085 patent to enable two-wire temperature sensing and, thus, the maintaining of the LEDs 110 within a safe operating temperature range. The driver module 120 also typically provides electrical isolation from the mains power, and is self-contained and may incorporate other features such as one or more fuses.

Figure 7A:
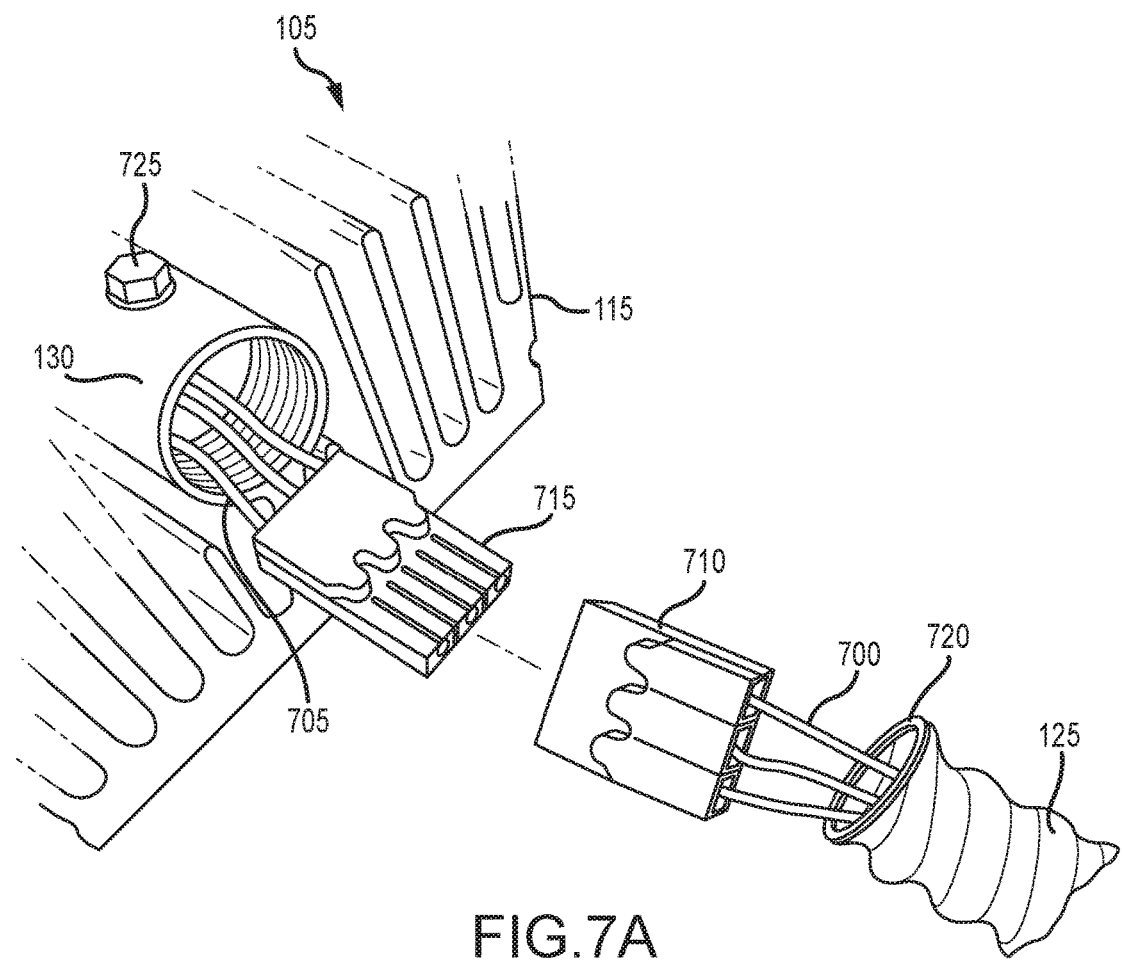
FIG. 7A is a view of an interconnection scheme for portions of a retrofit kit in accordance with embodiments of the invention.
Figure 7B:
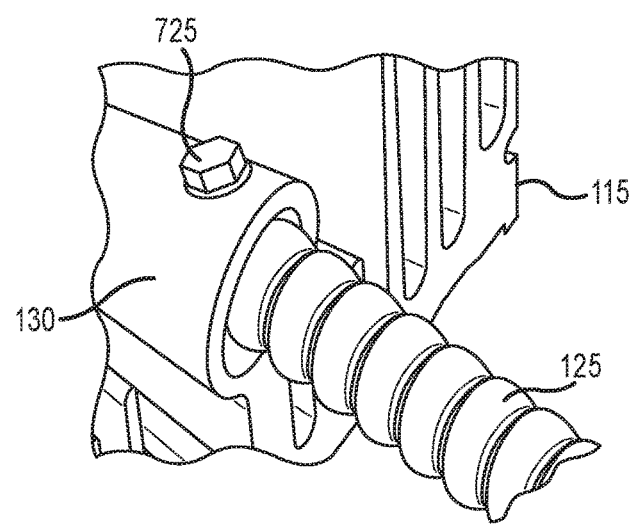
FIG. 7B is a view of the portions of the retrofit kit shown in FIG. 7A after interconnection.

As shown in FIG. 1, the lighting module 105 and the driver module 120 may be connected by a flexible conduit 125 that houses the one or more (e.g., four, or, as shown in FIGS. 7A and 7B, three) wires that supply power to the LEDs 110 and transmit sensed temperature information and thermal-foldback control signals. The wires may be strain-relieved and are protected from environmental or mechanical damage by the flexible conduit 125. As shown, the flexible conduit 125 may extend between, and be threadedly engaged to, the driver module 120 and one end of a cylindrical mounting tube 130 attached to or defined by a portion of the heat sink 115 of the lighting module 105. The mounting tube 130 may extend along substantially along an entire dimension (e.g., width) of the heat sink 105. In other embodiments of the present invention, the flexible conduit 125 engages with the cylindrical mounting tube 130 via a pivotable and/or rotatable conduit connector as described in U.S. Provisional Patent Application No. 62/097,822, filed on Dec. 30, 2014, the entire disclosure of which is incorporated by reference herein.

The retrofit kit 100 also preferably includes an alignment bracket 135 that attaches within the RCD fixture and receives the lighting module 105 during the retrofit installation. As described in more detail below, the alignment bracket 135 preferably includes one or more features configured to "self-align" the lighting module 105 during installation. The retrofit kit 100 may also include a diffuser assembly 140 configured to mechanically attach to the lighting module 105 and diffuse the light emitted by the LEDs 110. The diffuser assembly 140 may be removably attachable to the lighting module 105. The diffuser assembly 140 may have an opening sized to substantially accommodate the illumination surface (or "substrate") of the lighting module 105, and may have, opposite the opening, a diffusive surface or removable diffusive plate for diffusing the light emitted by the LEDs 110 (so that, e.g., individual points of light corresponding to the LEDs 110 are not discernable by an observer). The diffuser assembly 140 may define an interior volume (or "mixing chamber") in which the LED light is distributed via, for example, reflection from one or more reflective sidewalls of the diffuser assembly 140.

Figure 2A:
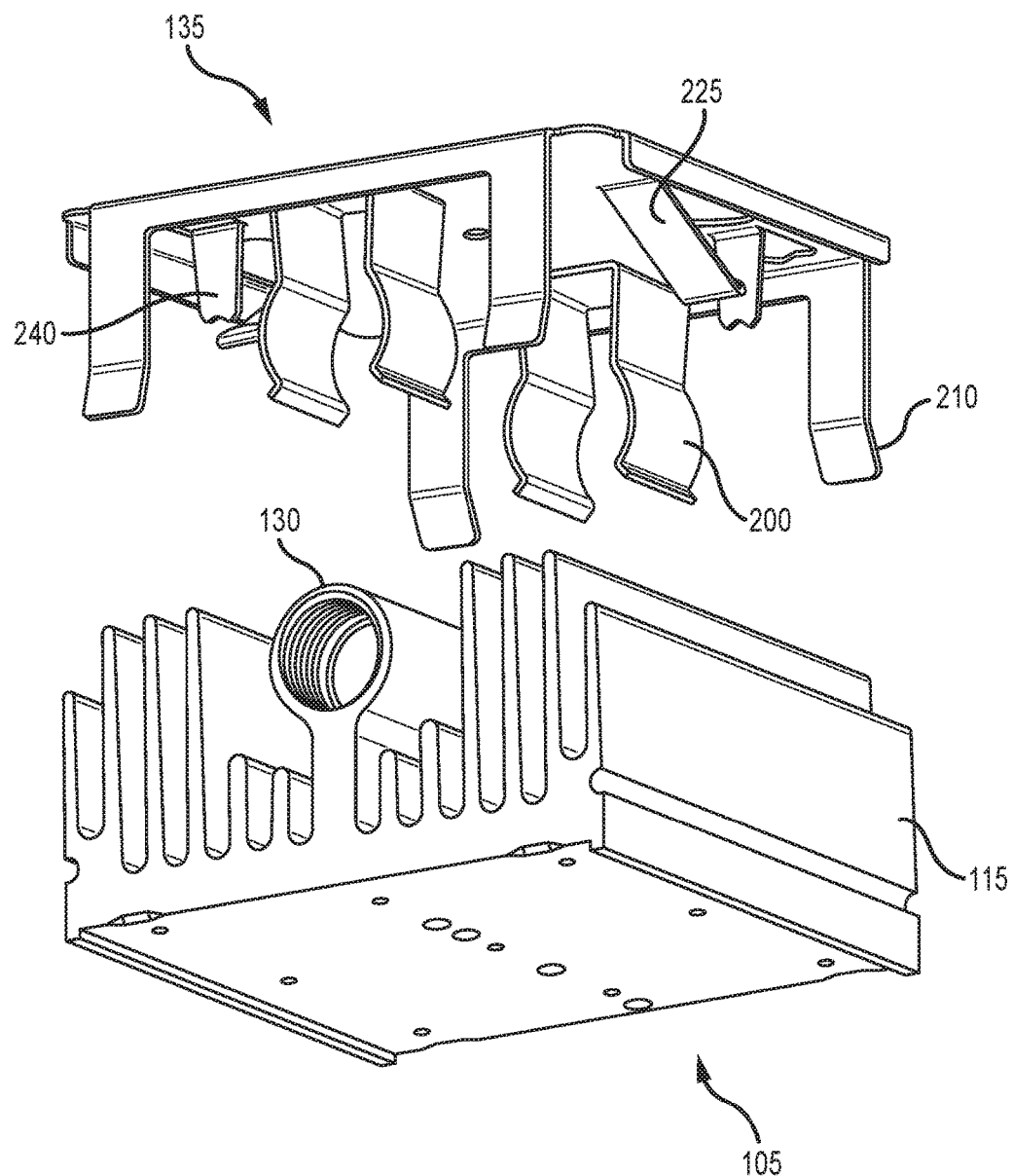
FIG. 2A is an exploded view of portions of a retrofit kit in accordance with embodiments of the invention.

FIGS. 2A-2E depict various features of the alignment bracket 135 and the heat sink 115 of the lighting module 105 configured to facilitate rapid and repeatable installation of the retrofit kit 100 within an RCD fixture. As shown in FIG. 2A, the alignment bracket 135 may include one or more mounting clips 200 (or "mounting c-clips" or "mounting c-clip leaf springs") that are configured to receive and partially encircle the mounting tube 130 of the heat sink 115, such that, when the mounting tube 130 seats into the alignment bracket 135 (see FIG. 2D), the mounting tube 130 is seated within the mounting clips 200. As shown in FIG. 2C, as the heat sink 115 is pressed upwards when the lighting module 105 is seated into the alignment bracket 135, the mounting clips 200 receive the cylindrical mounting tube 130 and thus center the heat sink 115 within the mounting bracket 135 with a centering and/or leveling force (represented by arrows 235).

As also shown in FIG. 2A, the alignment bracket 135 also may feature one or more vertical leaf springs 210 (or "front-to-back alignment leaf springs") extending from each of multiple sides of the alignment bracket 135. The vertical leaf springs 210 are configured to align the heat sink 115 with the alignment bracket 135 when the lighting module 105 is seated into the alignment bracket 135. As shown in FIG. 2B, when the lighting module 105 is seated into the alignment bracket 135 (via, e.g., force exerted by the installer, represented by arrow 215), each vertical leaf spring 210 exerts an alignment (or "centering") force (represented by arrows 220) on one or more fins of the heat sink 115.

Figure 2D:
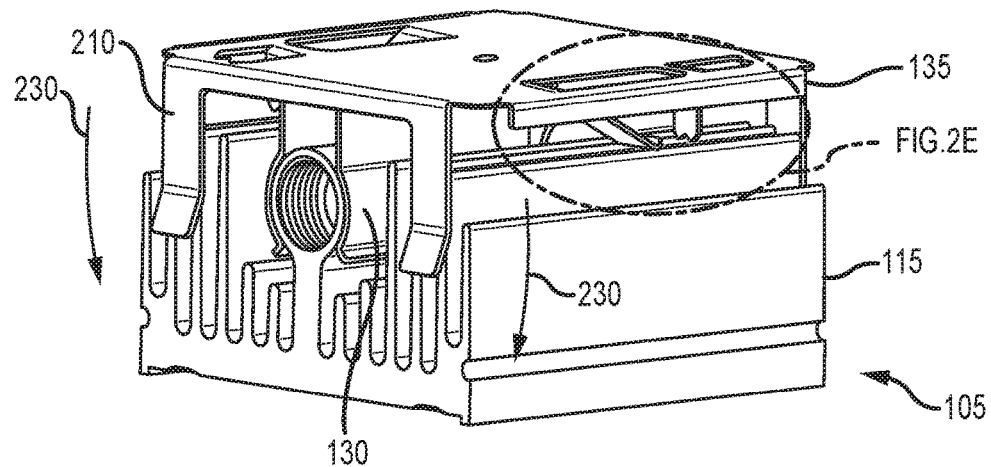
Figure 2E:
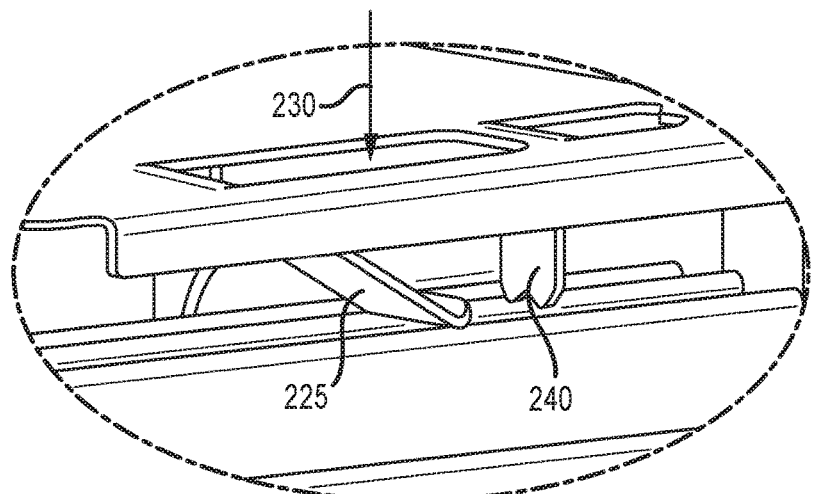
FIG. 2E is a magnified view of a portion of the retrofit kit depicted in FIG. 2D.

The alignment bracket 135 may also include multiple rotation leaf springs 225 (or "rotation alignment leaf springs") that extend from the bottom surface of the alignment bracket 135 and are configured to exert a leveling force on the heat sink 115 when the lighting module 105 is seated into the alignment bracket 135. As shown in FIGS. 2D and 2E, when the lighting module 105 is seated into the alignment bracket, the rotation leaf springs exert leveling force on the heat sink so as to maintain the lighting module 105 (and/or features thereof) approximately parallel to the bottom surface of the alignment bracket 135. For example, rotation leaf springs 225 positioned on opposite sides of the bottom surface of the alignment bracket 135 may impose substantially equal torque (represented as arrows 230) when the mounting tube 130 is seated within the mounting clips 200, thereby "leveling" the lighting module 105 within the alignment bracket 135 and within the RCD fixture. As also shown in FIGS. 2A, 2D, and 2E, each rotation leaf spring 225 may be associated with a rotation leaf spring stop 240 positioned to contact a portion (e.g., a fin) of the heat sink 115 upon application of a predetermined amount of force on the associated rotation leaf spring 225. In this manner, the rotation leaf spring stops 240 limit the amount of force that may be exerted on the rotation leaf springs 225 and thus prevent the rotation leaf springs 225 from becoming overstressed or breaking.

Figure 3B:
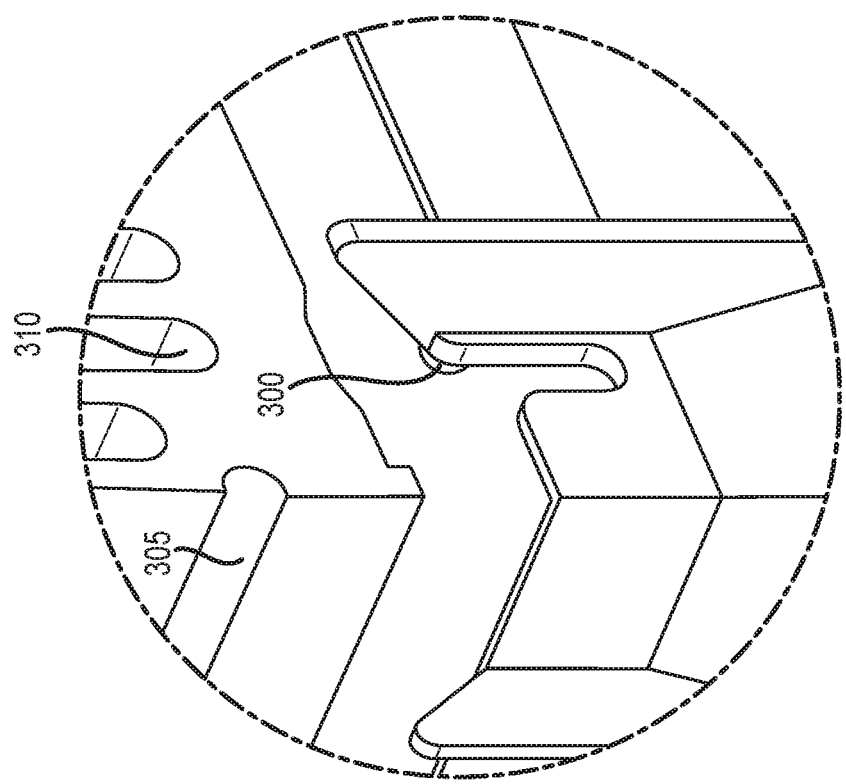
FIG. 3B is a magnified view of a portion of the retrofit kit depicted in FIG. 3A.
Figure 3A:
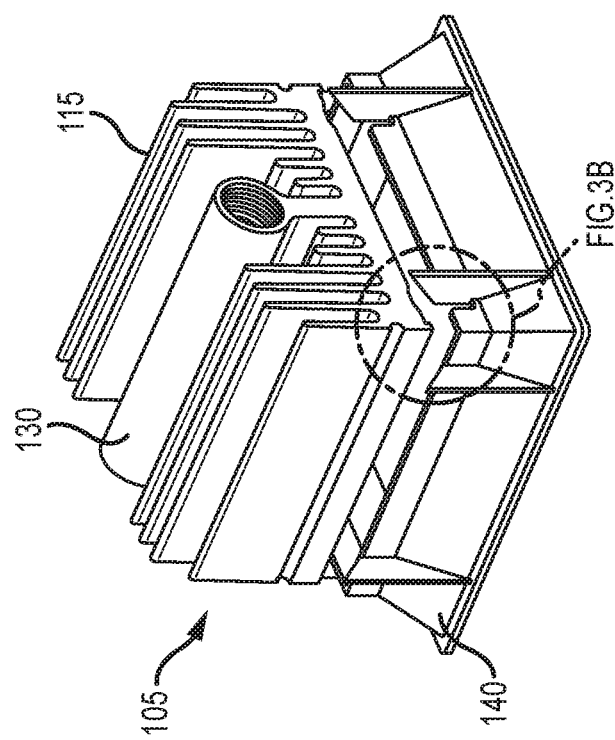
FIG. 3A is a view of portions of a retrofit kit interfitting together in accordance with embodiments of the invention.
Figure 3C:
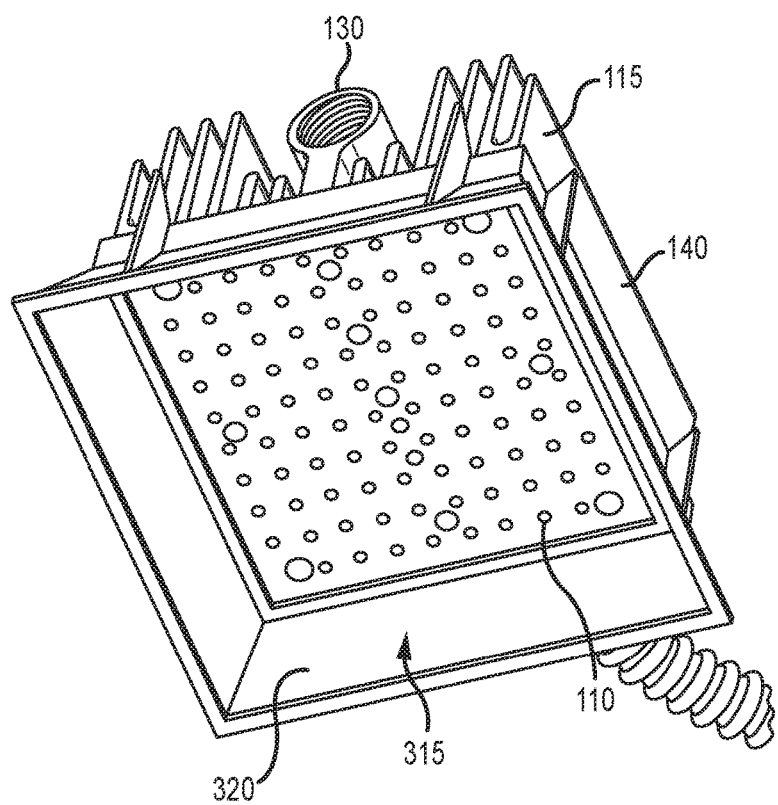
FIG. 3C is a bottom view of portions of a retrofit kit in accordance with embodiments of the invention.

FIGS. 3A-3C depict the diffuser assembly 140 of the retrofit kit 100 in greater detail. As shown, the diffuser assembly 140 may be reversibly attachable to the lighting module 105 (e.g., to the heat sink 115 of the lighting module 105) via one or more protrusions 300 each configured to engage the lighting module 105 via, e.g., a recessed groove 305 in the heat sink 115 or a gap 310 between fins of the heat sink 115, as shown in FIGS. 3A and 3B. The protrusions 300 may be rounded, e.g., shaped as, for example, hemispheres or partial spheres. As mentioned above, and as shown in FIG. 3C, the diffuser assembly 140 may feature an at least partially enclosed mixing chamber 315 in which the light emitted by the LEDs 110 is mixed, combined, and substantially equally distributed and emitted through the diffusive surface of the diffuser assembly 140 (not shown for clarity). The interior sidewalls 320 of the mixing chamber 315 are thus preferably reflective and/or angled with respect to the surface normal of the emission surface of the lighting module 105 on which the LEDs 110 are disposed. For example, the interior sidewalls 320 may be coated with white paint or be composed of a suitably reflective material. Preferably, the individual LEDs 110 of the lighting module 105 are not visible to an observer once the retrofit kit 100 is installed due to the presence of the diffuser assembly 135 and its diffusive bottom surface.

Figure 4:
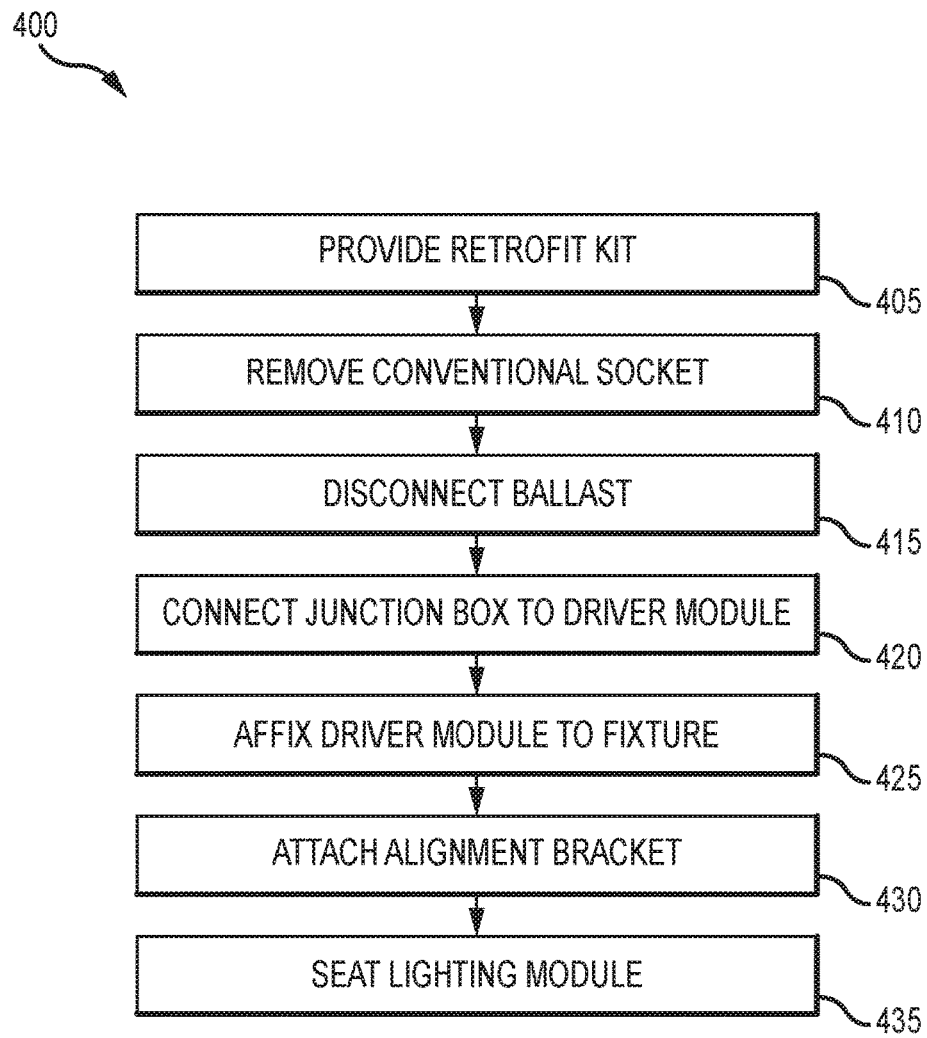
FIG. 4 is a flowchart of a method of installation of a retrofit kit in accordance with embodiments of the invention.
Figure 5A:
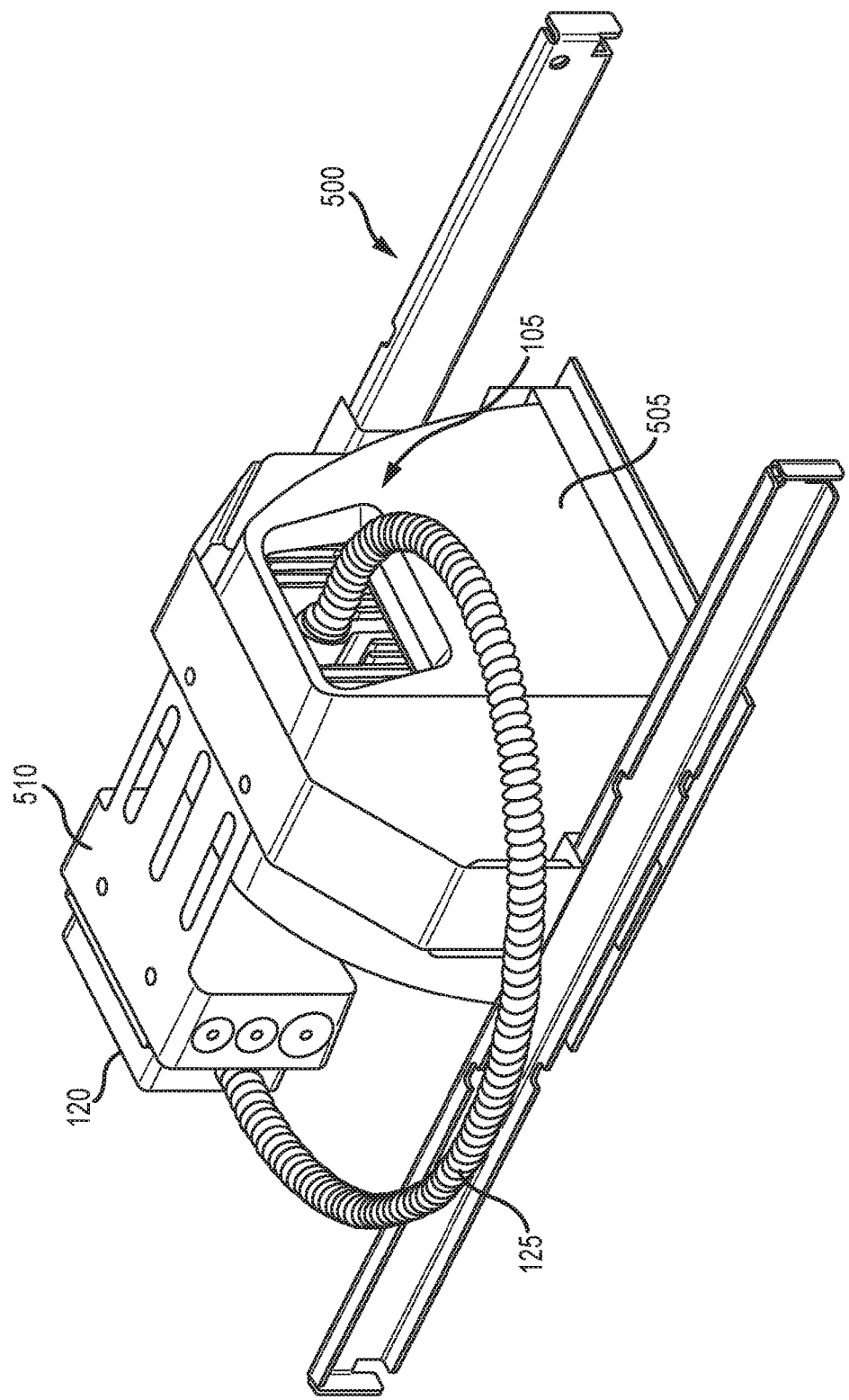

Referring to FIGS. 4, 5A, and 5B, in accordance with various embodiments of the invention, the retrofit kit 100 is utilized to upgrade an RCD (e.g., a fluorescent light-based RCD). The RCD to be upgraded may feature a fixture 500 at least partially recessed into a ceiling, a reflective housing 505 disposed in the fixture 500, a socket for a conventional (e.g., fluorescent) light bulb within the housing 505, and a junction box 510 (or "j-box"). The junction box 510 is typically disposed outside of the housing 505 and electrically connected to the socket via, e.g., one or more wires. The junction box 510 also typically includes electrical connections to the power source supplying power to the RCD (e.g., the AC mains), and the junction box 510 may also include a ballast for receiving power from the power source and supplying compatible power to the conventional light bulb.

As shown in FIG. 4, in step 405 of a method 400, power to the fixture 500 is shut off, e.g., at the circuit breaker panel for the fixture 500, and the retrofit kit 100 is provided. Then, in a step 410, the conventional bulb(s) (if present) and the socket for the conventional bulb are typically removed from the reflective housing 505, and in a step 415, the ballast (if present) is disconnected from the junction box 510. In a step 420, the electrical connections of the junction box 510 are connected to the driver module 120, and in a step 425, the driver module 120 is affixed to the fixture 500 (and/or to the junction box 510) outside of the housing 505 (and preferably, above the ceiling). At this point, the flexible conduit 125 typically extends into the housing 505 such that the lighting module 105 is adjustably positionable within the housing 505 (as shown in FIG. 5A). In a step 430, the alignment bracket 135 is then attached within the housing 505, for example, on the interior of the top surface of the housing 505. Finally, in a step 435, the lighting module 105 is seated into the alignment bracket 135 to retain the lighting module 105 within the reflective housing 505. The diffuser assembly 140 may also be attached to (e.g., snapped into place on) the lighting module 105 at any point in the installation procedure, or the diffuser assembly 140 may be pre-installed on the lighting module 105. Power to the fixture 500 is then restored, and the LEDs 110 of the lighting module 105 supply the illumination previously supplied by the conventional light bulb(s).

FIGS. 5A and 5B depict the retrofit kit 100 installed within the RCD fixture 500. As shown, the lighting module 105 remains electrically connected only to the driver module 120 (and thus only indirectly connected to the junction box 510), and thus not directly electrically connected to the junction box 510, during subsequent operation of the lighting module 105. This arrangement facilitates rapid and easy installation of the retrofit kit 100, including the electrical connection of the retrofit kit 100 to the RCD power source. In addition, the driver module 120 is mounted and present outside of the RCD housing 505, facilitating the retrofitting of even low-profile or small RCD fixtures which need not accommodate the driver module 120 in addition to the lighting module 105.

Figure 6:
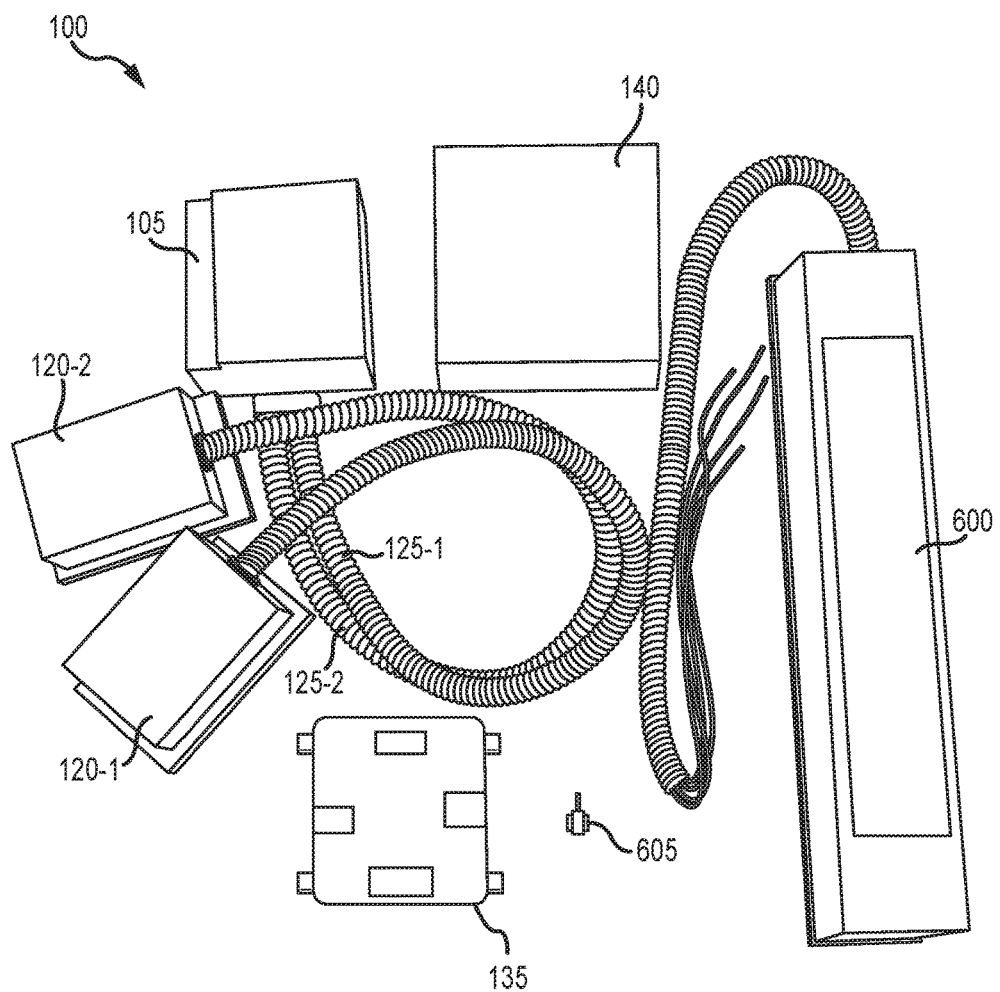
FIG. 6 is a view of a retrofit kit in accordance with embodiments of the invention.

In various embodiments of the present invention and as shown in FIG. 6, the retrofit kit 100 may also incorporate a back-up source of power 600, such as one or more batteries. For example, the retrofit kit 100 may incorporate two different driver modules 120-1, 120-2 each connected to the lighting module 105 via a separate flexible conduit 125 (shown as 125-1, 125-2 in FIG. 6). One driver module 120-1 may be connected to the AC mains, as detailed above, and the other driver module 120-2 may be connected to the back-up source of power 600. Thus, the retrofit kit 100 may include the back-up source of power 600, which in some embodiments includes or consists essentially of a micro inverter that includes one or more batteries (e.g., rechargeable batteries), such as one of the ELI SERIES Emergency Lighting Inverters (e.g., the ELI-S-20) available from Philips Bodine of Collierville, Tenn. The micro inverter (or other back-up source of power 600) provides a back-up source of power, via the second driver module 120-2, to the lighting module 105, thus allowing the lighting module 105 to function even in the event of loss of power from the AC mains. The micro inverter may be connected to the second driver module 120-2 (via, e.g., flexible conduit 125-2), and both the micro inverter and the second driver module 120-2 may be positioned in or near the fixture 500 but outside of the housing 505.

As also shown in FIG. 6, retrofit kit 100 may include a threaded stand-off 605. In some embodiments, the housing 505 is affixed to the fixture 500 via a fastener such as a screw and wingnut. When the alignment bracket 135 is seated into the housing 505, it is typically attached to the housing 505 via the same fastener, and the fastener (e.g., the screw) may have a length insufficient to affix both the housing 505 and the alignment bracket 135 within the fixture 500. In such cases, the stand-off 605 may be attached to the fastener to lengthen the fastener and facilitate the installation of the alignment bracket 135.

As mentioned above and depicted in FIGS. 1 and 2A, the flexible conduit 125 may extend between, and be threadedly engaged to, the driver module 120 and one end of the cylindrical mounting tube 130. Thus, at least one end of the cylindrical mounting tube 130 may be threaded for engagement with the flexible conduit 125. FIGS. 7A and 7B depict an alternative engagement technique for the flexible conduit 125. As shown, the wires 700 extending through the flexible conduit 125 from the driver module 120 may be attached to wires 705 extending from the lighting module 105 and through the cylindrical mounting tube 130 via, e.g., a connector plug that includes or consists of connector plug ends 710, 715. The end of the flexible conduit 125 configured for attachment to the mounting tube 130 may also have an insulating bushing 720 therein or thereon to prevent wire shorts. Once the wires 700, 705 are connected, the flexible conduit 125 may be mechanically connected to the mounting tube 130 via a set screw 725 that extends through the wall of the mounting tube 130 and engages with the flexible conduit 125 (e.g., between cylindrical protrusions thereof), as shown in FIG. 7B. Alternatively or in addition, a c-clamp, a spring clamp, a band clamp, or a clamping collar (e.g., a one-piece clamping collar or a two-piece clamping collar) may be utilized to mechanically connect the flexible conduit 125 to the mounting tube 130.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of upgrading, to an illumination device based on one or more light-emitting diodes (LEDs), a fluorescent downlight illumination device comprising (i) a fixture at least partially recessed into a ceiling, (ii) a reflective housing disposed in the fixture, (iii) a socket for a fluorescent light bulb disposed within the housing, and (iv) disposed outside of the housing and electrically connected to the socket, a junction box comprising (a) electrical connections to a power source and (b) a ballast for receiving power from the power source and supplying compatible power to the fluorescent light bulb, the method comprising:

providing a retrofit kit comprising (i) a lighting module comprising: (a) one or more LEDs, (b) a substrate having a bottom surface upon which the one or more LEDs are disposed, and (c) a heat sink disposed on a top surface of the substrate opposite the bottom surface, (ii) a driver module comprising circuitry for receiving power from the power source and supplying compatible power to the one or more LEDs, (iii) a flexible conduit connecting the lighting module to the driver module and containing therewithin a plurality of wires electrically connecting the lighting module to the driver module, and (iv) an alignment bracket for attachment within the housing and receiving the lighting module, wherein the heat sink further comprises a thermally conductive material shaped to define (a) a plurality of fins extending away from the substrate, and (b) integral with one or more of the fins, a cylindrical mounting tube;

removing the socket for the fluorescent light bulb from the housing;

disconnecting the ballast from the junction box;

connecting the electrical connections of the junction box to the driver module;

affixing the driver module to the fixture outside of the housing and above the ceiling, the flexible conduit extending into the housing such that the lighting module is positionable within the housing;

attaching the alignment bracket within the housing;

and seating the lighting module into the alignment bracket to retain the lighting module within the reflective housing, the lighting module remaining not directly electrically connected to the junction box during operation of the lighting module.

2. The method of claim 1, wherein the cylindrical mounting tube extends along substantially an entire width of the heat sink.

3. The method of claim 1, wherein (i) the alignment bracket comprises one or more mounting clips configured to partially encircle the mounting tube of the heat sink, and (ii) when the lighting module is seated into the alignment bracket, the mounting tube is seated within the one or more mounting clips.

4. The method of claim 1, wherein the flexible conduit is configured for connection to the lighting module at one end of the cylindrical mounting tube.

5. The method of claim 4, wherein the end of the cylindrical mounting tube connected to the flexible conduit is threaded.

6. The method of claim 4, wherein the retrofit kit comprises a connection means for securely attaching the flexible conduit to the end of the cylindrical mounting tube.

7. The method of claim 6, wherein the connection means comprises at least one of a set screw or a c-clamp.

8. The method of claim 1, wherein the alignment bracket comprises one or more vertical leaf springs (a) extending from each of a plurality of sides of the alignment bracket and (b) configured to align the heat sink with the alignment bracket when the lighting module is seated into the alignment bracket, whereby when the lighting module is seated into the alignment bracket, each vertical leaf spring exerts an alignment force on one or more fins of the heat sink.

9. The method of claim 1, wherein the alignment bracket comprises a plurality of rotation leaf springs (a) extending from a bottom surface of the alignment bracket and (b) configured to exert a leveling force on the heat sink when the lighting module is seated into the alignment bracket, whereby when the lighting module is seated into the alignment bracket, the rotation leaf springs maintain the substrate of the lighting module approximately parallel to the bottom surface of the alignment bracket.

10. The method of claim 9, wherein the alignment bracket comprises, associated with each of one or more of the rotation leaf springs, a rotation leaf spring stop positioned to contact a fin of the heat sink upon application of a predetermined amount of force on the associated rotation leaf spring, thereby limiting an amount of force exertable on the associated rotation leaf spring.

11. The method of claim 1, wherein the retrofit kit comprises a diffuser assembly configured to (i) mechanically attach to the lighting module below the bottom surface of the substrate and (ii) diffuse light emitted by the one or more LEDs transmitted through the diffuser assembly, and further comprising mechanically attaching the diffuser assembly to the lighting module.

12. The method of claim 11, wherein the diffuser assembly is reversibly attachable to the lighting module.

13. The method of claim 11, wherein (i) the heat sink defines a recessed groove in each of a plurality of sides of the heat sink, and (ii) the diffuser assembly comprises a plurality of protrusions each configured to engage the heat sink within one of the recessed grooves.

14. The method of claim 11, wherein the diffuser assembly (i) defines an opening sized to substantially accommodate the substrate of the lighting module, (ii) comprises, opposite the opening, a diffusive surface for diffusing the light emitted by the one or more LEDs, and (iii) comprises, extending from the opening to the diffusive surface, one or more reflective sidewalls for distributing the light emitted by the one or more LEDs within an interior volume of the diffuser assembly.

15. The method of claim 1, wherein the retrofit kit comprises (i) a back-up power source, (ii) a second driver module, discrete from the driver module, comprising circuitry for receiving power from the back-up power source and supplying compatible power to the one or more LEDs, and (iii) a second flexible conduit connecting the lighting module to the second driver module and containing therewithin a plurality of wires electrically connecting the lighting module to the second driver module.

16. The method of claim 15, further comprising affixing the back-up power source and the second driver module to the fixture outside of the housing and above the ceiling, the second flexible conduit extending into the housing such that the lighting module is positionable within the housing.

17. The method of claim 15, wherein the back-up power source comprises a micro inverter.

18. A retrofit kit for upgrading, to an illumination device based on one or more light-emitting diodes (LEDs), a downlight illumination device comprising (i) a fixture at least partially recessed into a ceiling, (ii) a reflective housing disposed in the fixture, (iii) a socket for a light bulb, and (iv) disposed outside of the housing and electrically connected to the socket, a junction box comprising electrical connections to a power source, the retrofit kit comprising:
a lighting module comprising (a) one or more LEDs disposed on a substrate having a top and bottom surface and (b) a heat sink disposed on the top surface of the substrate, wherein the heat sink comprises a thermally conductive material shaped to define (1) a plurality of fins extending away from the substrate, and (2) a cylindrical mounting tube, integral with one or more of the fins;
a driver module comprising circuitry for receiving power from the power source and supplying compatible power to the one or more LEDs;
a flexible conduit connecting the lighting module to the driver module and containing therewithin a plurality of wires electrically connecting the lighting module to the driver module; and
an alignment bracket for attachment within the housing and configured to receive the lighting module.

19. The retrofit kit of claim 18, wherein the cylindrical mounting tube extends along substantially an entire width of the heat sink.

20. The retrofit kit of claim 18, wherein the alignment bracket comprises one or more mounting clips configured to partially encircle the mounting tube of the heat sink, whereby, when the lighting module is seated into the alignment bracket, the mounting tube is seated within the one or more mounting clips.

21. The retrofit kit of claim 18, wherein the flexible conduit is configured for connection to the lighting module at one end of the cylindrical mounting tube.

22. The retrofit kit of claim 21, wherein the end of the cylindrical mounting tube connected to the flexible conduit is threaded.

23. The retrofit kit of claim 21, further comprising a connection means for securely attaching the flexible conduit to the end of the cylindrical mounting tube.

24. The retrofit kit of claim 23, wherein the connection means comprises at least one of a set screw or a c-clamp.

25. The retrofit kit of claim 18, wherein the alignment bracket comprises one or more vertical leaf springs (i) extending from each of a plurality of sides of the alignment bracket and (ii) configured to align the heat sink with the alignment bracket when the lighting module is seated into the alignment bracket, whereby, when the lighting module is seated into the alignment bracket, each vertical leaf spring exerts an alignment force on one or more fins of the heat sink.

26. The retrofit kit of claim 25, wherein the alignment bracket comprises a plurality of rotation leaf springs (i) extending from a bottom surface of the alignment bracket and (ii) configured to exert a leveling force on the heat sink when the lighting module is seated into the alignment bracket, whereby, when the lighting module is seated into the alignment bracket, the rotation leaf springs maintain the substrate of the lighting module approximately parallel to the bottom surface of the alignment bracket.

27. The retrofit kit of claim 26, wherein the alignment bracket comprises, associated with each of one or more of the rotation leaf springs, a rotation leaf spring stop positioned to contact a fin of the heat sink upon application of a predetermined amount of force on the associated rotation leaf spring, thereby limiting an amount of force exertable on the associated rotation leaf spring.

28. The retrofit kit of claim 18, further comprising a diffuser assembly configured to (i) mechanically attach to the lighting module below the bottom surface of the substrate and (ii) diffuse light emitted by the one or more LEDs transmitted through the diffuser assembly.

29. The retrofit kit of claim 28, wherein the diffuser assembly is reversibly attachable to the lighting module.

30. The retrofit kit of claim 28, wherein (i) the heat sink defines a recessed groove in each of a plurality of sides of the heat sink, and (ii) the diffuser assembly comprises a plurality of protrusions each configured to engage the heat sink within one of the recessed grooves.

31. The retrofit kit of claim 28, wherein the diffuser assembly (i) defines an opening sized to substantially accommodate the substrate of the lighting module, (ii) comprises, opposite the opening, a diffusive surface for diffusing the light emitted by the one or more LEDs, and (iii) comprises, extending from the opening to the diffusive surface, one or more reflective sidewalls for distributing the light emitted by the one or more LEDs within an interior volume of the diffuser assembly.

32. The retrofit kit of claim 18, further comprising (i) a back-up power source, (ii) a second driver module, discrete from the driver module, comprising circuitry for receiving power from the back-up power source and supplying compatible power to the one or more LEDs, and (iii) a second flexible conduit connecting the lighting module to the second driver module and containing therewithin a plurality of wires electrically connecting the lighting module to the second driver module.

33. The retrofit kit of claim 32, wherein the back-up power source comprises a micro inverter.

* * * * *